United States Patent [19]

Martino et al.

[11] 4,049,762

[45] Sept. 20, 1977

[54] METHOD OF FORMING A PIPE COUPLING

[75] Inventors: Paul D. Martino; Norris H. Barbre, both of Weatherford, Tex.

[73] Assignee: Harsco Corporation, Camp Hill, Pa.

[21] Appl. No.: 613,288

[22] Filed: Sept. 15, 1975

Related U.S. Application Data

[63] Continuation of Ser. No. 385,232, Aug. 3, 1973, abandoned, which is a continuation-in-part of Ser. No. 164,519, July 21, 1971, abandoned.

[51] Int. Cl.² .................. B29C 17/07; B29D 23/03; B29F 5/00
[52] U.S. Cl. ............................ 264/94; 264/322
[58] Field of Search ............ 264/93, 94, 97, 98, 264/DIG. 52, 40, 88, 296, 92, 40, 5; 425/387, 387 B, 392, 400, 405, 457, 135, 149

[56] References Cited

U.S. PATENT DOCUMENTS

| 2,897,840 | 8/1959 | Roberts et al. ........... 264/DIG. 52 |
| 2,983,961 | 5/1961 | Titterton et al. ............... 264/98 |
| 3,380,121 | 4/1968 | Chittenden et al. ............ 264/94 |
| 3,410,937 | 11/1968 | Winchester ................... 264/98 |
| 3,461,505 | 8/1969 | Schroeder et al. ............ 425/392 |
| 3,495,301 | 2/1970 | Stephens et al. ............. 425/392 |
| 3,651,186 | 3/1972 | Hall ........................... 264/94 |
| 3,825,386 | 7/1974 | Bello et al. .................. 425/135 |

OTHER PUBLICATIONS

Ernst, Hydraulic Power and Its Industrial Applications, McGraw-Hill (1949), pp. 266–271.

*Primary Examiner*—Willard E. Hoag
*Attorney, Agent, or Firm*—Cameron, Kerkam, Sutton, Stowell & Stowell

[57] ABSTRACT

A process for making a heavy walled pipe coupling wherein pre-formed thermoplastic pipe stock is heated to a soft pliable condition and blow-molded into a desired configuration. The molding step is accomplished in a mold cavity having openings in opposite ends thereof to receive retractable pistons which expand and seal ends of the pipe before blow air is injected. The coupling produced has an inside diameter which is greater than the outside diameter of the pipe stock blank, has a central stop element, and has spaced receptacles for receiving self-energizing seals to provide increased sealing capability as pressure is increased.

7 Claims, 20 Drawing Figures

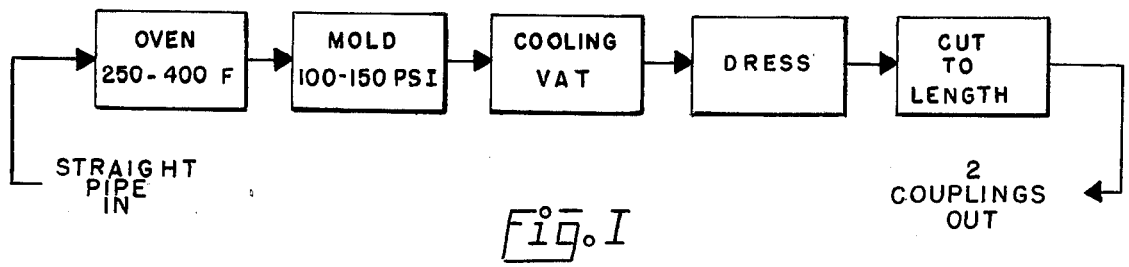
Fig. I
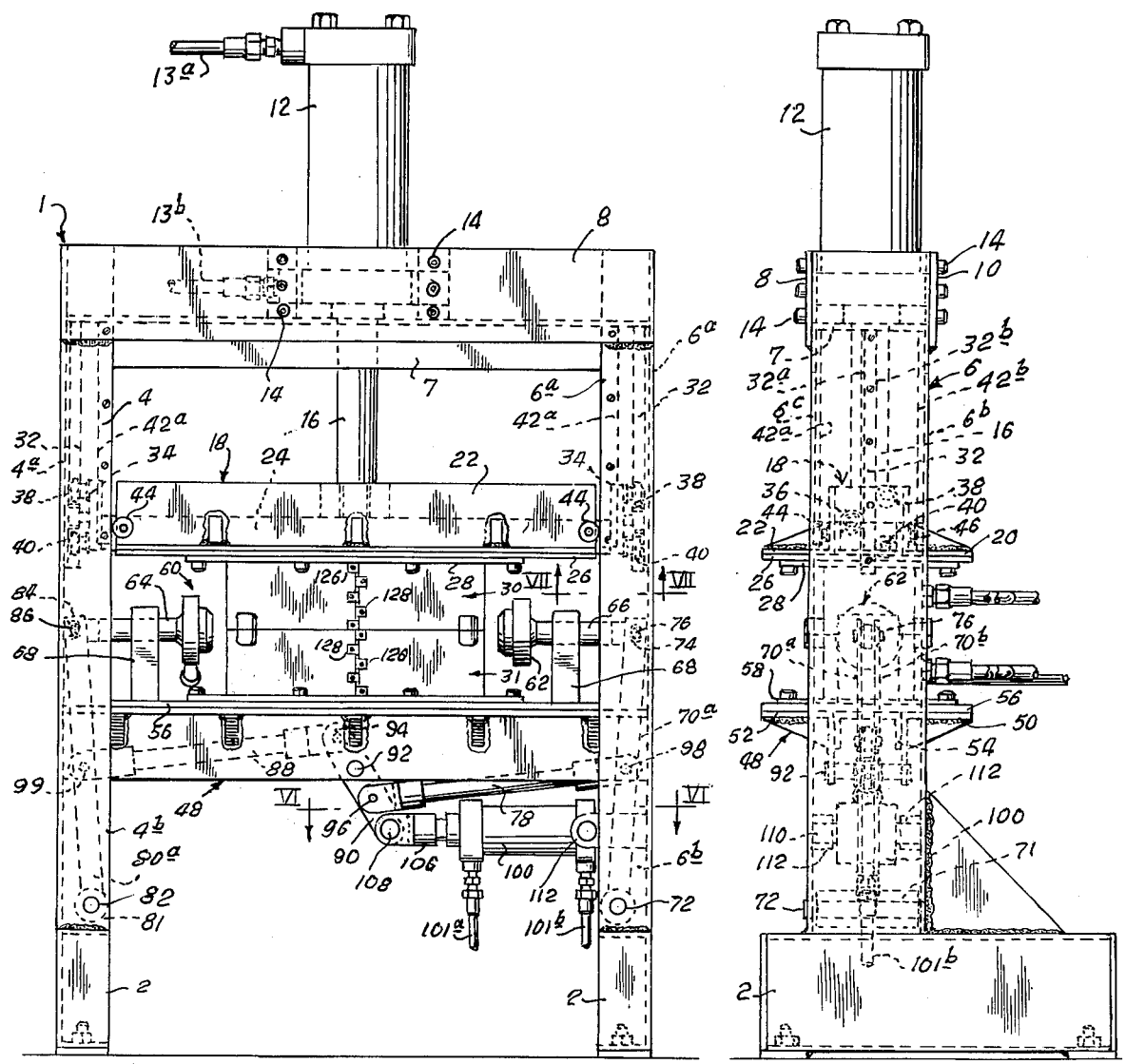
Fig. II
Fig. III
INVENTORS
Paul D. Martino
Norris H. Barbre

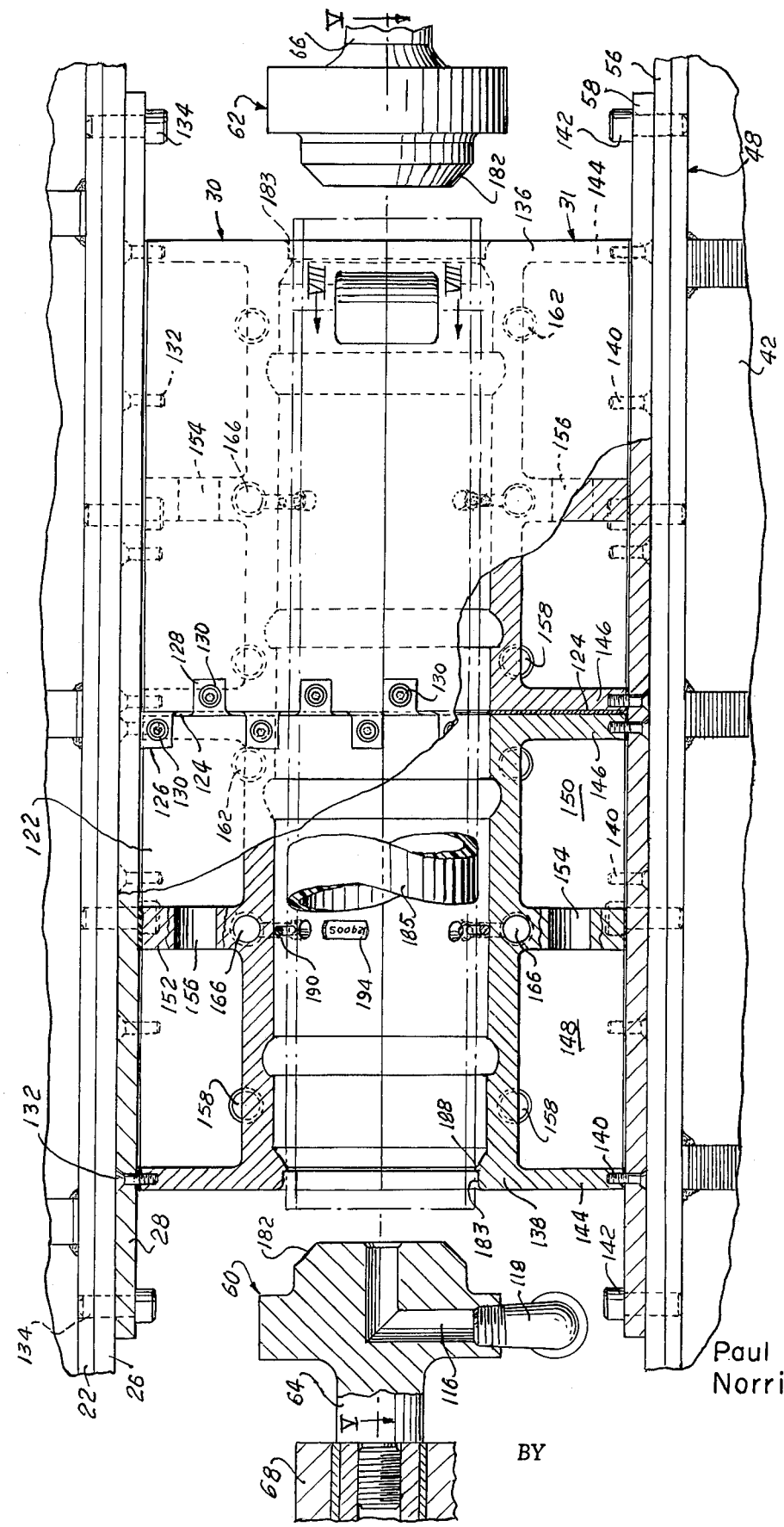
Fig. IV
INVENTORS
Paul D. Martino
Norris H. Barbre
BY

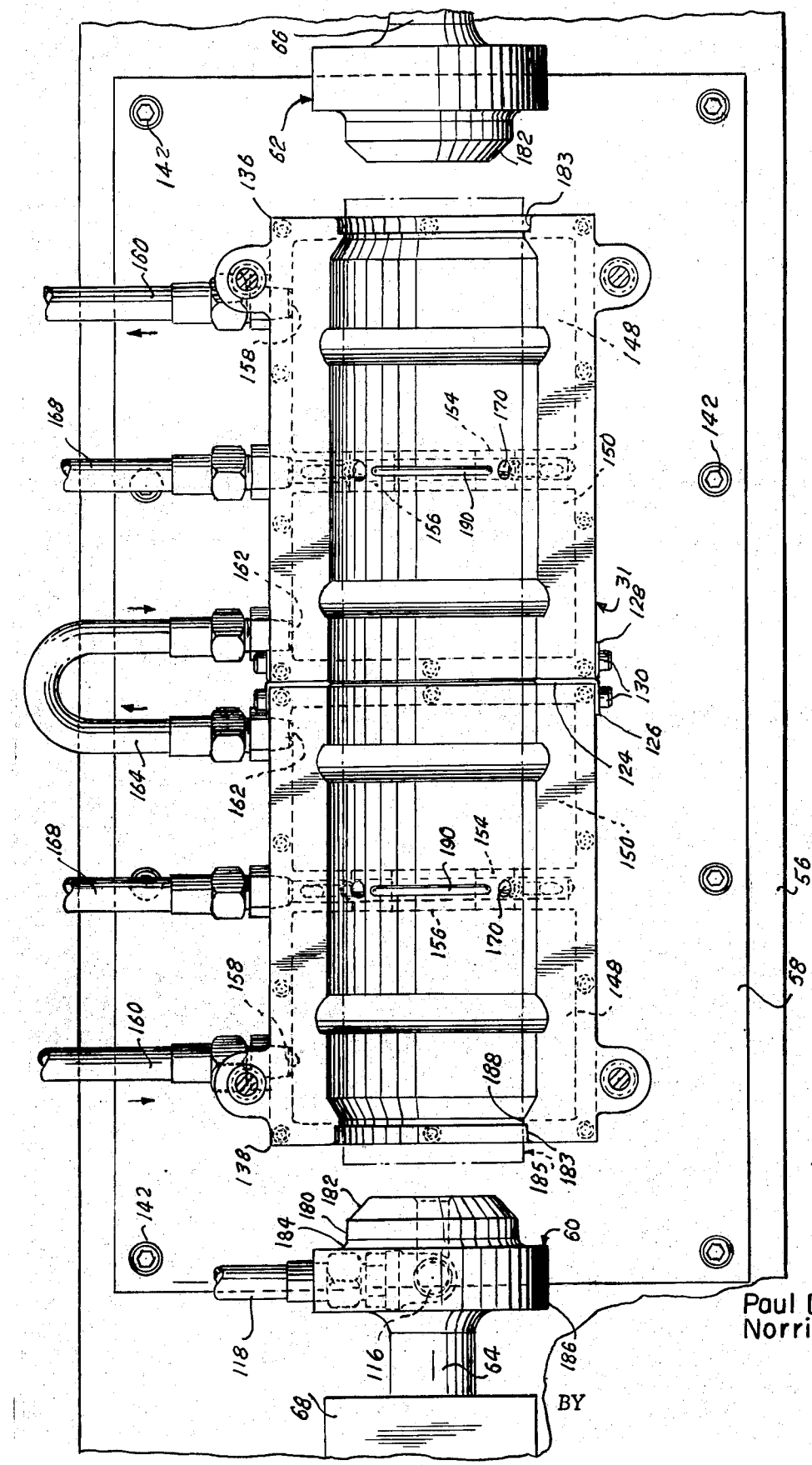

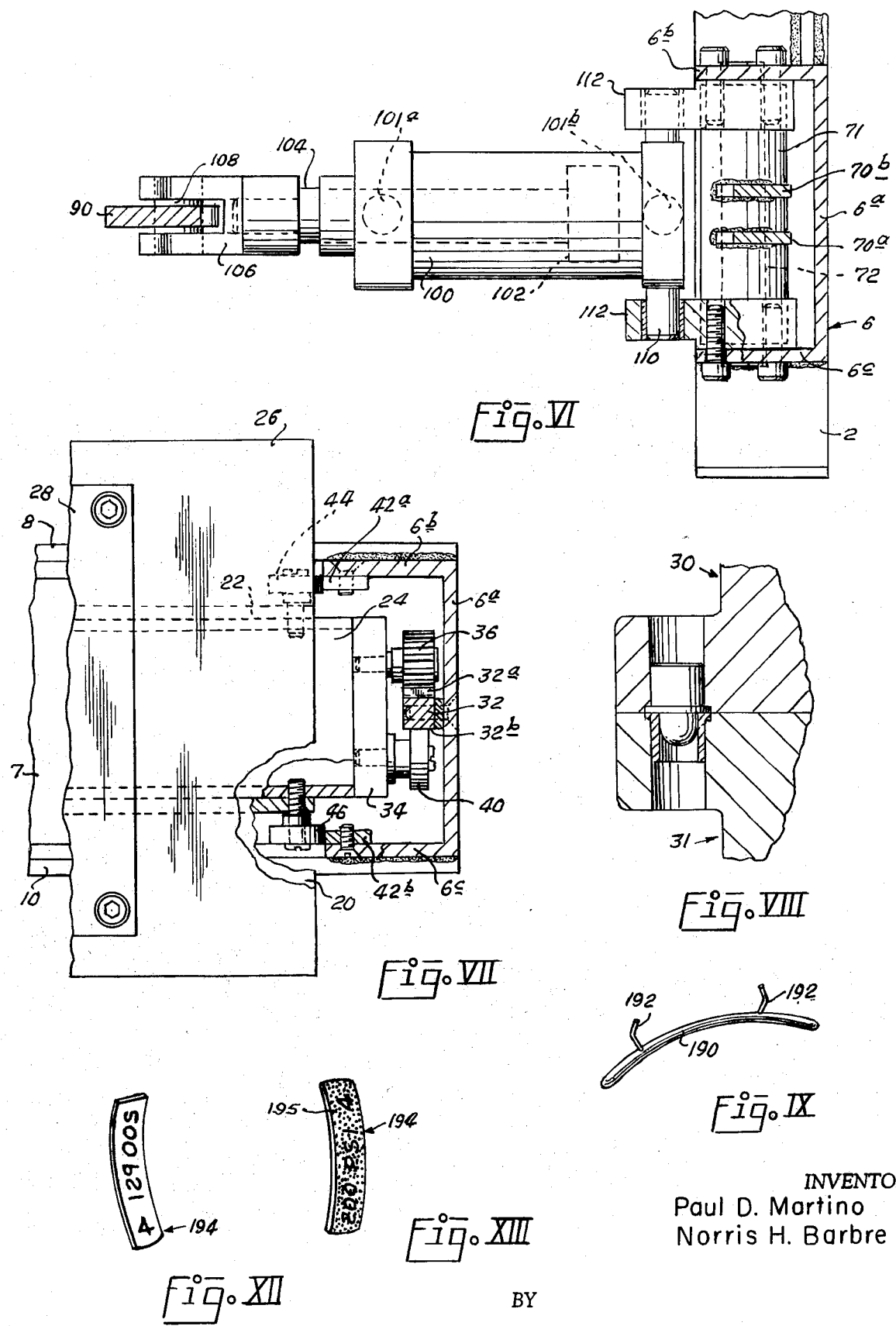

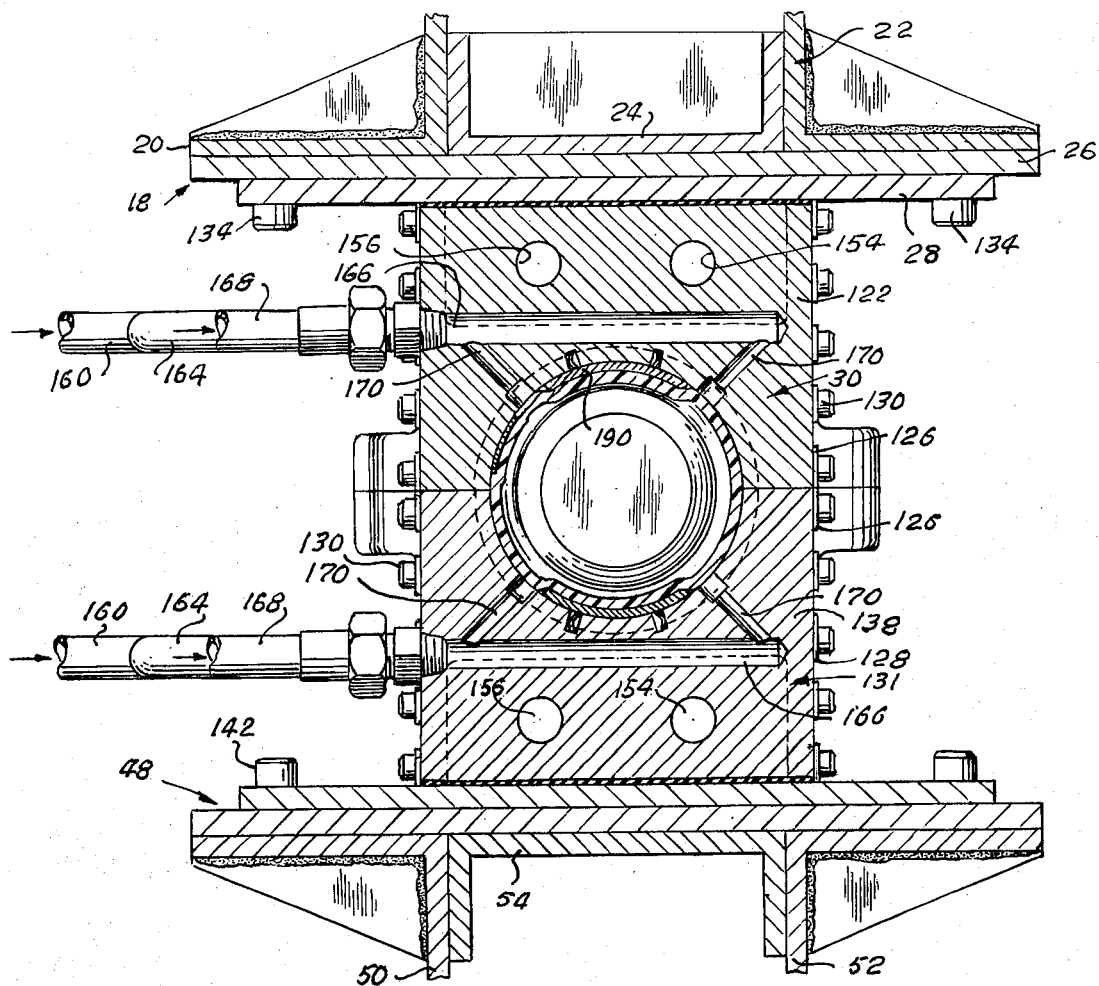
Fig. XV
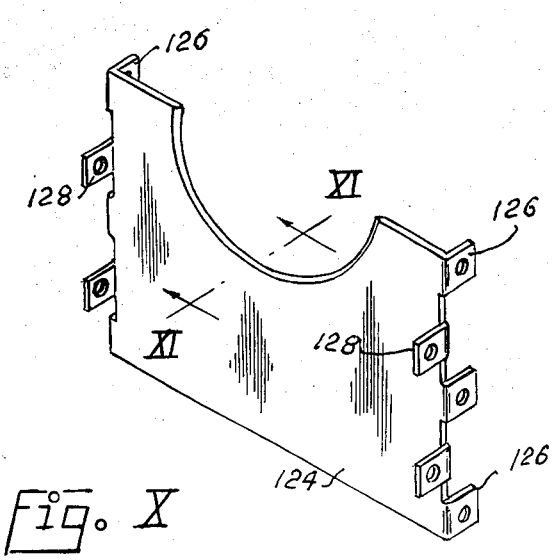
Fig. X
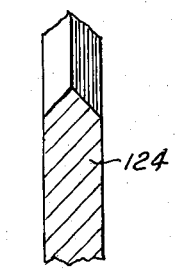
Fig. XI
INVENTORS
Paul D. Martino
Norris H. Barbre
BY
ATTORNEYS

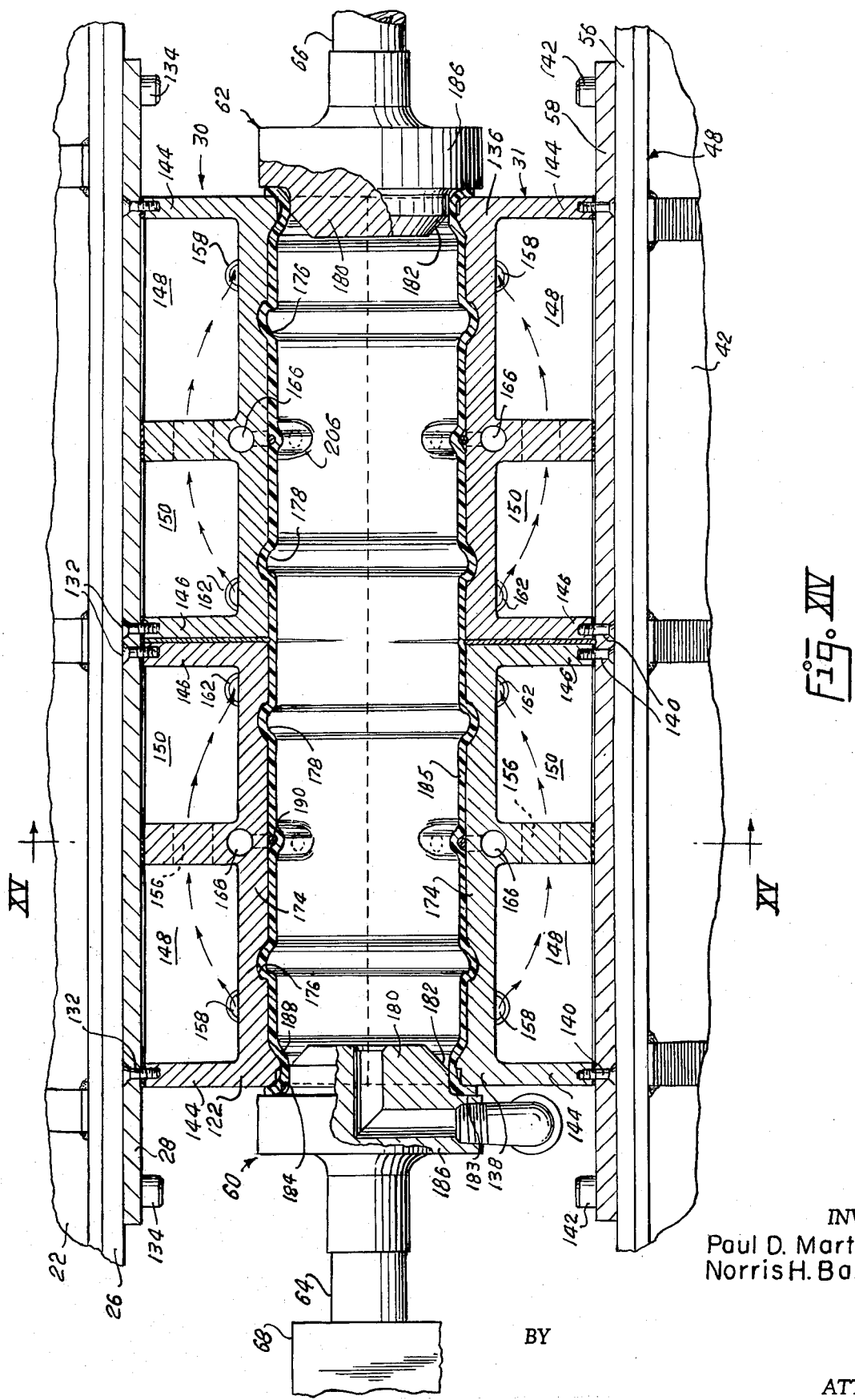

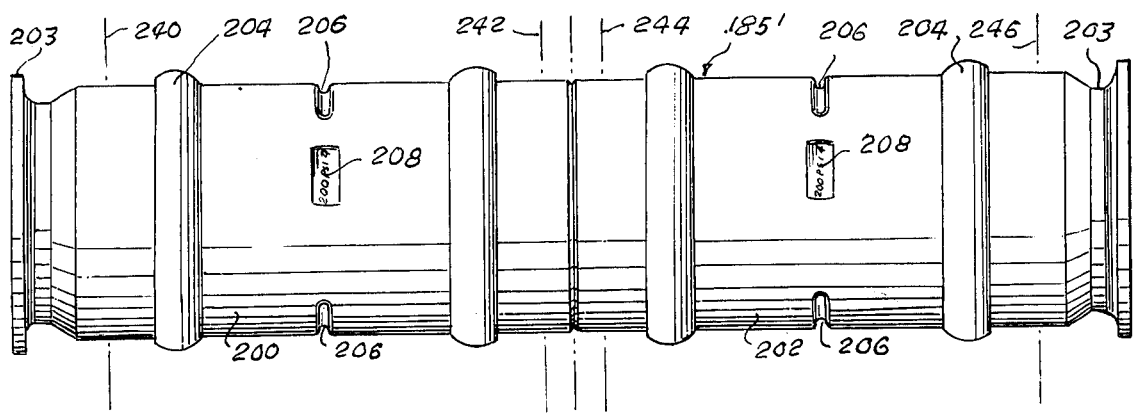
Fig. XVI
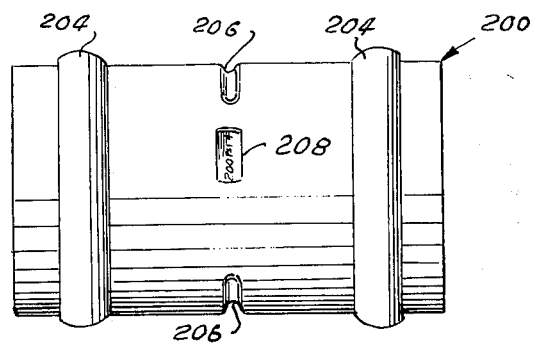
Fig. XVII
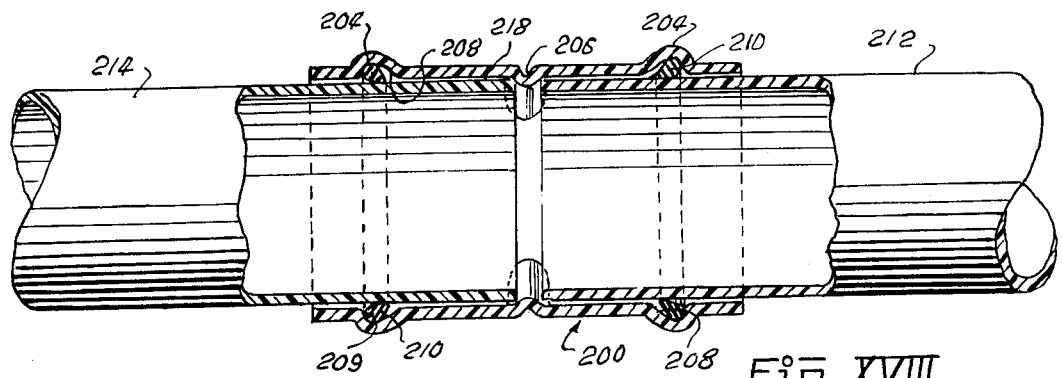
Fig. XVIII
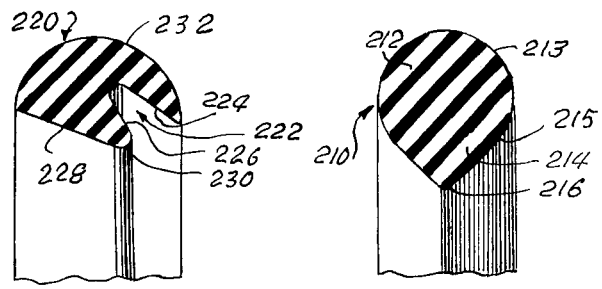
Fig. XIX  Fig. XX
INVENTORS
Paul D. Martino
Norris H. Barbre
BY
ATTORNEYS

METHOD OF FORMING A PIPE COUPLING

CROSS-REFERENCE TO RELATED APPLICATIONS

This application is a continuation of Ser. No. 385,232, filed Aug. 3, 1973 and now abandoned, which was a continuation in part of application Ser. No. 164,519 filed July 21, 1971 and also is abandoned.

BACKGROUND OF THE INVENTION

Plastic pipe constructed of material such as polyvinylchloride is employed for transporting fluids. Such pipe is generally extruded in standard diameters, cut to desired length, and stored until it is used.

Sections of pipe are joined by suitable couplings which must be particularly adapted to provide specified sealing characteristics.

Heretofore couplings for joining ends of extruded pipe have been constructed by molding processes, such as injection molding, utilizing specialized equipment to provide the required heat and pressure to form the coupling. Such equipment is expensive to purchase, expensive to operate, and is not readily adaptable for forming couplings of different sizes.

SUMMARY OF INVENTION

We have developed a process of making an improved pipe coupling from extruded pipe commercially available in standard dimensions.

Generally, the process comprises heating a section of pipe, for example in an oven at a temperature in a range between 250° and 400° Fahrenheit, until the pipe is sufficiently soft to be expanded by low pressure air, for example in a pressure range between 100 and 150 pounds per square inch, to a desired surface configuration.

The molding apparatus employed comprises a segmented mold into which a section of softened pipe is positioned. Preferably, the length of the softened pipe exceeds the length of the mold and opposite ends of the pipe extend through openings at opposite ends of the mold. After the segmented mold is closed and locked, sealing pistons move inwardly to engage opposite ends of the pipe thereby swedging the ends of the pipe for sealing opposite ends thereof.

The sealing pistons are preferably simultaneously actuated into sealing engagement with ends of the pipe. Compressed air is released from a central portion of at least one of the pistons for urging the soft pipe against cooled mold walls for forming a desired configuration.

A primary object of the invention is to provide a process of making pipe couplings wherein inexpensive standard pipe stock is utilized for forming the coupling, eliminating the use of expensive manufacturing processes heretofore employed.

Another object of the invention is to provide a process of making pipe couplings wherein general purpose equipment is employed for forming a softened blank for molding.

Another object of the invention is to provide a process of making couplings which employs relatively low pressure blow air, for example 100 to 150 pounds per square inch, for forming a thick walled, for example ¼ inch, pipe coupling.

Another object of the invention is to provide improved molding apparatus for forming pipe couplings having pistons adapted to close opposite ends of a tubular blank and for delivering blow air to the inside thereof.

A further object of the invention is to provide apparatus for molding pipe couplings having a single actuating means to simultaneously close and seal opposite ends of a cylindrical blank.

A further object of the invention is to provide an improved coupling for joining ends of pipe, said coupling supporting a compression member in sealing engagement with surfaces of the coupling and the pipe.

A still further object of the invention is to provide a self-energizing seal for use in a pipe coupling wherein pressure in the pipe is employed for establishing a seal between the coupling and the pipe, such that an increase in pressure increases the sealing capacity of the coupling.

Other and further objects of the invention will become apparent upon referring to the description hereinafter following and the drawing annexed hereto.

DESCRIPTION OF DRAWINGS

FIG. I is a flow diagram of the process of making a pipe coupling;

FIG. II is a side elevational view of molding apparatus;

FIG. III is a side elevational view of the molding apparatus illustrated in FIG. II;

FIG. IV is an enlarged partially sectionalized elevational view of the segmented mold;

FIG. V is a cross-sectional view taken along line V—V of FIG. IV;

FIG. VI is a cross-sectional view taken along line VI—VI of FIG. II;

FIG. VII is a cross-sectional view taken along line VII—VII of FIG. II;

FIG. VIII is a cross-sectional view taken along line VIII—VIII of FIG. IV;

FIG. IX is a perspective view of a removable insert positionable in the mold for forming a center stop in a pipe coupling;

FIG. X is a perspective view of a mold divider for connecting portions of the segmented mold;

FIG. XI is a cross-sectional view taken along line XI—XI of FIG. X;

FIG. XII is a front perspective view of an imprinting device connectable to the inside of the mold to provide notice of recommended pressure limits specified for the coupling;

FIG. XIII is a perspective view of the back of the imprinting device illustrated in FIG. XII;

FIG. XIV is a cross-sectional view taken along line XIV—XIV of FIG. V;

FIG. XV is a cross-sectional view taken along line XV—XV of FIG. XIV;

FIG. XVI is an elevational view of a plurality of pipe couplings, illustrating the configuration thereof as removed from a mold;

FIG. XVII is an elevational view of the pipe coupling after trimming.

FIG. XVIII is a partially sectionalized view of a pipe coupling employed for joining pipes;

FIG. XIX is a cross-sectional view of a first form of the seal ring; and

FIG. XX is a cross-sectional view of a modified form of th seal ring.

Numeral references are employed to designate like parts throughout the various figures in the drawing.

DESCRIPTION OF A PREFERRED EMBODIMENT

Referring to FIG. II of the drawing, the numeral 1 generally designates a blow molding press employed for accomplishing the molding step of the process diagrammatically illustrated in FIG. 1.

The press 1 comprises base members 2 secured to lower ends and upwardly extending support members 4 and 6. The upper ends of support members 4 and 6 are connected by transversely extending members 8 and 10 welded or otherwise secured thereto. A channel member 7 having downwardly extending flanges is secured between members 8 and 10.

A double acting hydraulic cylinder 12 is secured by suitable means such as bolts 14 to central portions of members 8 and 10. Cylinder 12 has a piston (not shown) slidably disposed therein to which rod 16 is secured.

The lower end of rod 16 is secured to a carriage 18, which as best illustrated in FIG. XV comprises angle members 20 and 22 welded or otherwise secured to a channel member 24. A platen 26 is secured to the carriage and is adapted to support a mounting plate 28 on upper mold part 30, as will be hereinafter more fully explained.

Inter-engaging means is provided between upwardly extending support members 4 and 6 and carriage 18 for maintaining platen 26 in a horizontal attitude.

As best illustrated in FIGS. II, III and VII, support member 6 comprises a channel member having a web 6a and spaced flanges 6b and 6c. A rack 32, bolted or otherwise secured to the web 6a of support member 6, has teeth 32a disposed in spaced apart relation along one side thereof and has a substantially flat guide surface 32b on the other side thereof.

A mounting bracket 34 is welded or otherwise secured to the end of channel member 24 for rotatably supporting a pinion 36 having teeth in meshing relation with teeth 32a on rack 32.

Rollers 38 and 40 are rotatably secured in spaced apart relation to bracket 34 and are disposed in rolling contact with surface 32b of rack 32. It should be appreciated that pinion 36 and rollers 38 and 40 are positioned to engage opposite sides of rack 32 allowing vertical movement of carriage 18 while limiting lateral movement thereof.

Flanges 6b and 6c of support member 6 have tracks 42a and 42b secured thereto by suitable means such as set screws. Rollers 44 and 46, rotatably secured to upwardly extending portions of angle members 22 and 20, respectively, are disposed in rolling contact with tracks 42a and 42b, respectively.

Referring to FIG. II, it will be noted that support member 4 has a rack 32 secured to the web 4a thereof and has tracks 42a and 42b secured to flange portions 4b and 4c.

Carriage 18 has rollers 44 and 46 rotatably disposed at opposite sides thereof in rolling engagement with tracks 42a and 42b and has rollers 38 and 40 and a pinion gear 36 in rolling engagement with rack 32 on support member 4 as hereinbefore described in relation to the guide means secured to support member 6.

It should be appreciated that rollers 44 and 46, in rolling engagement with tracks on support member 4 and 6, rollers 38 and 40, and pinions 36 maintain platen 26 in a horizontal attitude as carriage 18 is moved vertically on rod 16 of cylinder 12.

As best illustrated in FIGS. II and XV, a table 48 having opposite ends secured to support members 4 and 6, intermediate opposite ends thereof, is adapted to support lower mold parts 31.

Table 48 comprises spaced angle members 50 and 52 having opposite ends welded or otherwise secured to support members 4 and 6. A channel member 54 is positioned between angle members 50 and 52 providing a surface to which lower platen 56 is secured. Lower platen 56 is adapted to be connected by a suitable means to lower mounting plate 58 to which lower mold parts 31 are connected.

Closure means 60 and 62 are provided for sealing opposite ends of a tubular blank 185 disposed in cavity 172 of upper and lower mold parts 30 and 31.

As best illustrated in FIG. II and III closure members 60 and 62 are secured to shafts 64 and 66, respectively, which are slidably disposed in support blocks 68 secured to the upper surface of lower platen 56. Spaced arms 70a and 70b have lower ends pivotally connected by a pin 72 between flanges 6b and 6c of support member 6. Upper ends of arms 70a and 70b have elongated apertures 74 formed therein in which a pin 76, secured to shaft 66, is secured. Suitable means, including link 78, is provided for pivoting arms 70a and 70b about pin 72.

Arms 80a and 80b are pivotally connected by a pin 82 to flanges 4b and 4c of support member 4 and have elongated apertures 84 formed in upper ends thereof. A pin 86, extending through apertures 84, is connected to shaft 64. A link 88 is provided for pivoting links 80a and 80b about the pin 82.

A central portion of crank 90 is pivotally connected by suitable means such as pin 92 between downwardly extending portions of angle members 50 and 52 of table 48. Ends of links 78 and 88 are pivotally connected by pins 94 and 96 to spaced portions of crank 90 on opposite sides of pin 92. Pins 98 and 99 pivotally connect ends of links 78 and 88, respectively, to arms 70a and 70b and arms 80a and 80b.

As best illustrated in FIG. VI, a double acting hydraulic cylinder 100, having a piston 102 and a rod 104, is positioned for rotating crank 90. A clevis 106, secured to rod 104, is pivotally connected by suitable means, such pin 108, to the lower end of crank 90. Cylinder 100 is connected by a pin 110 to spaced lugs 112 secured to flange portions 6b and 6c of support member 6.

Opposite ends of cylinder 100 are connected through conduits 101a and 101b to a suitable source of pressurized fluid (not shown) for moving piston 102 for imparting rotation to crank 90 to move closure members 60 and 62 between positions illustrated in FIGS. IV and XIV of the drawings.

As best illustrated in FIG. IV at least one of the closure members 60 has a passage 116 formed therein connected through a conduit 118 to a suitable source of pressurized fluid (not shown).

As best illustrated in FIG. IV, upper mold part 30 preferably comprises mold segments 120 and 122 joined by a mold divider 124 (see FIG. X) having outwardly extending ears 126 and 128 through which bolts 130 extend.

Mold segments 120 and 122 of upper mold part 30 are connected by suitable means, such as set screws 132, to upper mounting plate 28 which is secured by screws 134 to upper platen 26.

Lower mold part 31 comprises mold segments 136 and 138 joined by mold divider 124. Set screws 130 are employed for connecting lower mold part 31 to mounting plate 58 which is secured by suitable means such as set screws 142 to lower platen 56.

Each mold segment 120, 122, 136 and 138 is of identical construction having end walls 144 and 146. Water jackets 148 and 150 are formed in each mold segment, the water jackets being separated by a partition 152 having passages 154 and 156 extending therethrough. Passage 158 extends through a wall of each mold segment for connecting jacket 148 through a conduit 160 with a suitable source of cooling water (not shown). A passage 162 extends through the wall of each mold segment into jacket 150 and is connected through a conduit 164 to a suitable source of cooling water.

In the particular embodiment of the invention illustrated in FIGS. V and XIV of the drawing, cooling water is delivered through passage 158 in mold segment 138 along the path indicated by the arrows to passage 162, through conduit 164 and then along the path indicated by the arrows through mold segment 136 to return line 160 connected with passage 158 in mold segment 136.

As best illustrated in FIGS. XIV and XV, the partition 152 of each mold segment has a passage 166 formed therein communicating through line 168 with a source of pressurized air. A plurality of openings 170 communicate with mold cavity 172 allowing the use of pressurized air for ejecting molded parts from the mold segments.

Each mold segment has an inner wall 174 defining a portion of the periphery of mold cavity 172. Wall 174 has recesses 176 and 178 formed therein as will be hereinafter more fully explained.

End wall 144 of each mold segment has a seat 183 formed thereon extending about the periphery of an end of mold cavity 172. As best illustrated in FIG. XIV closure member 60 and 62 have discs 180 formed thereon. Each disc 180 has a beveled surface 182 forming a frusto-conical guide surface insertable into the end of a tubular blank 185. Disc 180 is connected by a fillet 184 to a piston 186. The configuration of bevel 182 and fillet 184 result in swedging ends of blank 185 to the configuration illustrated in FIG. XIV. The swedged ends of blank 185 in pressure contact with piston 186 and seat 183 form a seal preventing the escape of blow air injected into the hollow portion of blank 185.

It should be noted that seat 183 has an inwardly extending annular shoulder 188 extending thereabout to frictionally engage the outer surface of blank 185 to limit movement of ends of the blank longitudinally of mold cavity 172.

As best illustrated in FIGS. IX and XV, a rolled wire 190 having locking elements 192 formed thereon is disengageably connected to the inner wall 174 of mold cavity 172 for forming a center stop 206 in a coupling. For forming repair couplings, which ordinarily do not have a center stop formed therein, locking elements 192 may be disengaged from the wall 174 of cavity 172 allowing removal of wire 190.

Couplings are preferably marked to indicate the size of pipe with which it is compatible and maximum pressure which it is designed to withstand under ordinary conditions.

An imprinting element 194, best illustrated in FIGS. XII and XIII of the drawing, comprises a strip of material having printed matter imprinted thereon to form raised surfaces around depressions forming letters. The imprinting element 194 preferably has adhesive material 195 on the back side thereof to facilitate attachment of the imprinting device to the inner wall 174 of mold cavity 172. It should be readily apparent that the imprinting device 194, which preferably flexible plastic material may be expeditiously removed and replaced if it is deemed expedient to form couplings of different pressure ratings in the same mold.

Injection of pressurized fluid through passage 116 in closure element 60 results in expansion of softened blank 185 into engagement with wall 174 of davity 172. Cooling of the material in engagement with walls causes the formed blank to set in a configuration illustrated in FIG. XVI of the drawing. It should be noted that a plurality of couplings 200 and 202 are formed. The formed blank 185 has swedged end portions 203, seal ring receptacles 204, center stops 206, and indicia 208 indicating the size and pressure rating of the coupling.

As best illustrated in FIG. XVIII seal elements 210 are disposed in seal ring receptables 204, center stops 206, and indicia 208 indicating the size and pressure rating of the coupling.

As best illustrated in FIG. XVIII seal elements 210 are disposed in seal ring receptacles 204 and are adapted for sealing between inner surfaces of receptacles 204 and outer surfaces of ends of pipes 212 and 214 inserted in opposite ends thereof. It should be noted that pipes 212 and 214 engage center stop 206 limiting longitudinal movement of coupling 200 relative to pipes 212 and 214 positioned therein.

Seal ring 210 and the inner wall 208 of seal ring receptacle 204 are similarly shaped to allow twisting of seal ring 210 in one direction while resisting twisting motion in the other direction.

As best illustrated in FIGS. XVIII and XIX seal ring 210 has a cross-section comprising complex curves, the outer portion 212 having a substantially semi-circular configuration and the inner portion 214 having a substantially triangular configuration. The apex 216 of the inner section 214 of seal ring 210 forms an annular surface engaging the outer wall of a pipe inserted thereinto and preferably has a relaxed diameter which is less than the outside diameter of the pipe.

The inner wall 208 of the seal ring receptacle 204 has a cross-section comprising complex curves substantially conforming to the curvature of surfaces 213 and 215 of seal ring 210.

Referring to FIG. XVIII, it should be noted that the configuration of the inner wall 208 is adapted to receive seal ring 210. As the end of pipe 214 is moved longitudinally through coupling 200 toward center stop 206 the end of pipe 214 engages surface 215 of seal ring 210 causing the apex 216 of seal ring 210 to pivot and stretch as the end of the pipe moves therethrough. The inner wall 208 of receptacle 204 retains seal ring 210 in position but does not interfere with rotation and deformation thereof as the ring is moved to the position illustrated in FIG. XVIII.

Pressurized fluid in pipes 212 and 214 moves through space 218 between the outer wall of pipe 214 and the inner surface of the coupling 200. This fluid pressure, because of the configuration of surface 208, tends to rotate the apex 216 of seal ring 210 to the position illustrated in FIG. XIX. It should be readily apparent that increased pressure increases the wedging action urging apex 216 of seal ring 210 into sealing engagement with the outer wall of pipe 214.

The specific configuration of inner wall 208 of receptacle 204 in combination with the specific configuration of seal ring 210 permits insertion of an end of pipe 214 into coupling 200 without substantial difficulty while providing a seal particularly adapted to hold substantially high pressure, for example 200 pounds per square inch.

A modified form of the seal ring is illustrated in FIG. XX of the drawing. The seal ring 220 has a substantially semi-circular cross section with a slot 222, defined by surfaces 224 and 226, formed therein.

The inner surface 228 of seal ring 220 intersects surface 226 forming an apex 230.

It should be readily apparent that when seal ring 220 is positioned such that surface 232 engages the inner wall 208 of seal ring receptacle 204, an end of pipe 214 may be inserted therethrough moving apex 230 to a position wherein slot 222 is narrowed. However, pressure acting through space 218 exerts forces on surfaces 224 and 226 spreading the slot 222 thereby urging surfaces 232 and 228 into sealing engagement with surfaces 208 of seal ring receptacle 204 and with the outer surface of pipe 214.

The shoulder 209 in seal ring receptacle 204 prevents longitudinal movement of seal ring 220 by fluid pressure within coupling 200 when a pipe 214 is inserted as illustrated in FIG. XVIII.

OPERATION

The operation and function of the molding apparatus heretofore described for performing the process of making the coupling 200 is as follows:

A section of thermoplastic pipe is softened by placing same in an oven. The pipe is preferably heated to a temperature in a range between 250° and 400° Fahrenheit.

The softened blank is then positioned in the lower mold part 31, as illustrated in FIG. V.

Pressurized fluid is directed through line 13a to extend rod 16 of cylinder 12 for moving carriage 18 and upper mold part 30 to the closed position, as illustrated in FIG. IV, wherein upper mold parts 30 and lower mold parts 31 form cavity 172 around softened pipe 185.

Pressurized fluid is delivered through conduit 102b to the inside of cylinder 100 for extending rod 104.

Force applied by rod 104 pivots crank 90 about pin 92 for exerting forces through links 78 and 88 to move the upper ends of arms 80a and 80b inwardly positioning seal members 60 and 62 in the position illustrated in FIG. XIV. If seal member 60 or 62 engages the end of tubular member 185 before the other seal member engages the opposite end, the tubular member will be moved longitudinally and will be centered in the mold as both seal members engage ends thereof.

Blow air is directed through conduit 118 and passage 116 in seal member 60 to the inside of blank 185.

Movement of seal members 60 and 62 into the ends of blank 185 urges surfaces adjacent the ends of the blank into engagement with shoulder 188 formed in seat 183 in mold parts 30 and 31. Ends of blank 185 are swedged as illustrated in FIG. XIV forming an air tight seal at each end of blank 185. As the wall thickness of the tubular member 185 contracts upon expansion and cooling, the seal at each end of the tubular member is maintained by reason of constant fluid pressure applied to the seal members 60 and 62 to urge them inwardly toward each other.

Blow air is preferably in a pressure range between 100 and 150 pounds per square inch. However, it should be appreciated that the pressure may vary depending upon the temperature and physical characteristics of blank 185.

It should be appreciated the upper and lower mold parts 30 and 31 are cooled by cooling water flowing therethrough and are preferably maintained at a temperature which will quickly harden surfaces of blank 185 moved into contact therewith. However, since the blank 185 has an outside diameter, which is less than the inside diameter of the mold cavity 172, blank 185 may be positioned in the mold without engaging surfaces thereof with the exception of shoulders 188 which support the ends thereof. Surfaces of the blank do not begin cooling at an appreciable rate until blow air has been introduced to the inside of blank 185 expanding surfaces thereof into engagement with the inner wall 174 of cavity 172.

Wires 190, removably secured to the inner wall of mold cavity 172, are employed as desired and may be expeditiously removed if it is deemed expedient to do so. It should also be appreciated that a wire 190 having different dimensions may be connected to the inside of the mold forming center stops of different configurations.

When blank 185 has been formed to the configuration illustrated in FIG. XIV pressurized fluid is directed through conduit 109a for retracting rod 104 of cylinder 100 thereby moving closure members 60 and 62 to the position illustrated in FIG. II.

Pressurized fluid directed through line 13b to the inside cylinder 12 results in retraction of rod 16 for raising carriage 18 and upper mold parts 30.

Pressurized air is directed through conduit 168, passages 166, and openings 170 for ejecting the molded blank 185.

The molded blank 185', best illustrated in FIG. XVI, is removed from the mold cavity and cooled until completely set. The formed blank 185' is preferably deposited in a suitable cooling vat as indicated in FIG. I.

After the molded blank 185' has set, couplings 200 and 202 are separated as by sawing along lines 240–246 as indicated in FIG. XVI.

Ends of couplings 200 and 202 are then dressed as by grinding to remove burrs and irregular surfaces which might interfere with movement of ends of pipe 212 and 214 into the coupling.

It should be appreciated that the process hereinbefore described produces an improved coupling of the type illustrated in FIG. XVII and XVIII without the necessity of providing expensive molding apparatus for reducing molding material to a liquid state. It should also be appreciated that the quantity of heat transferred from the molded coupling 185' to mold parts 30 and 31 is less than that required for other molding processes, such as injection molding, thus increasing the cycle of operation of the apparatus.

The center stop forming wire 190 disengageably connectable to the inner wall of the mold cavity 172 permits modification of the specific configuration of the coupling. For example, to form a repair coupling, which is preferably longer than couplings ordinarily employed for connecting new pipe, the wire 190 may be removed from mold segments 120, 122, 136 and 138 and recesses 178 of each of said mold segments can be temporarily filled with putty or other material. This provides a coupling, approximately twice as long as the standard coupling, and having spaced seal ring receptacles 204 without a center-stop 206 therebetween. Thus if an installed coupling 200 begins to leak, pipe 212 can cut allowing removal of coupling 200. The long repair coupling is slipped onto the end of pipe 214, lowered into alignment with pipe 212, and then moved into sealing engagement with pipe 212. It should be apparent that such a repair coupling can be installed without digging up a substantial portion of buried pipe and can be formed without substantial modification of the molds.

It should also be appreciated that the specific configuration of the inner wall 208 of seal ring receptacle 204 does not appreciably interfere with deformation of the seal ring by the insertion of an end of a pipe into coupling 200. However, the configuration of surface 208 having a shoulder 209 at the outer end thereof results in a wedging action to increase the sealing capability of the seal ring over devices heretofore developed.

It should be appreciated that other and further embodiments of our invention may be devised without department from the basic concept of our invention.

Having discribed our invention, we claim:

1. A method of forming a thermoplastic pipe coupling comprising the steps of: heating a prefabricated thermoplastic tubular member to a soft pliable state; positioning the pliable tubular member in a mold cavity having walls maintained at a temperature to quickly harden a surface of the tubular member moved into contact therewith, the tubular member being positioned such that opposite ends of the tubular member extend beyond ends of the mod cavity; engaging only outer surfaces of the tubular member adjacent ends of the tubular member with mold portions to space walls of the tubular member from a major portion of the surface of walls of the mold cavity; moving seal members into engagement with opposite ends of the tubular member such that force is exerted on surfaces inside the ends of the tubular member to deform outer surfaces of the tubular member into sealing engagement with surfaces adjacent opposite ends of the mold cavity; urging the seal members into sealing engagement with inner surfaces of the tubular member; delivering pressurized fluid to a pressure actuated cylinder connected to the seal members to maintain constant pressure on said seal members to urge the seal members inwardly and to maintain a constant seal with the ends of the tubular members to compensate for the tendency of the wall of the tubular member to contract in length and thickness due to expansion of the diameter of the tubular member and cooling of the wall of the tubular member; and injecting pressurized fluid into the tubular member to urge walls of said tubular member into conformity with surfaces of the mold cavity.

2. The method called for in claim 1 wherein the prefabricated tubular member is heated to a temperature in a range between 250° and 400° Fahrenheit.

3. The method of claim 1 wherein the step of positioning the tubular member in a mold cavity comprises the steps of: placing the soft tubular member in a first mold part; moving a second mold part into engagement with the first mold part such that the soft tubular member occupies a cavity in the mold parts; and moving members into engagement with opposite ends of the tubular member to position the tubular member longitudinally of the cavity.

4. The method of claim 1 with the addition of the step of detachably securing a projection to the surface of the mold cavity intermediate opposite ends thereof.

5. The method of claim 1 wherein the step of injecting pressurized fluid comprises the step of: delivering pressurized fluid through a passage in at least one of the seal members.

6. A method of forming a thermoplastic pipe coupling comprising the steps of: heating a prefabricated thermoplastic tubular member to a soft pliable state; positioning said tubular member in a mold cavity having walls maintained at a temperature to quickly harden the surface of the tubular member moved into contact therewith; engaging outer surfaces of the tubular member only adjacent ends thereof with mold portions to space a major portion of walls of the tubular member adjacent opposite ends of the mold cavity from walls of the mold cavity; delivering pressurized fluid to a pressure actuated cylinder having a piston rod connected to a pair of seal members such that the seal members are moved into engagement with opposite ends of the tubular member to deform outer surfaces of the tubular member into sealing engagement with surfaces adjacent opposite ends of the mod cavity, such that the seal members are urged into sealing engagement with inner surfaces of the tubular member, and such that constant force is exerted by the pressure actuated cylinder on said seal members to maintain the seal members in a sealing relationship with the ends of the tubular member to compensate for the tendency of the wall of the tubular member to contract in length and thickness due to expansion of the diameter of the tubular member and cooling of the wall thereof; and injecting pressurized fluid into the tubular member into conformity with surfaces of the mold cavity.

7. A method of forming a pipe coupling comprising the steps of: inserting a preheated thermoplastic tubular member into a mold cavity, the mold cavity having a wall maintained at a temperature below the solidification temperature of the thermoplastic material during the inserting step; supporting the preheated tubular member only adjacent opposite ends of the tubular member and in spaced relation from a major portion of the wall of the mold cavity; moving seal members into engagement with opposite ends of the tubular member such that surfaces on the tubular member are sealingly compressed between the seal members and surfaces adjacent opposite ends of the mold cavity; delivering pressurized fluid through at least one of the seal members to urge walls of the tubular member into engagement with the wall of the mold cavity such that upon conforming to the shape of the wall of the mold cavity the wall of the tubular member is cooled to its solidification temperature; and applying constant fluid pressure to maintain the seal members in sealing engagement with opposite ends of the tubular member while the tubular member is being conformed to the shape of the mold cavity and while the wall of the tubular member is cooling.

* * * * *